(12) United States Patent
Kitaura et al.

(10) Patent No.: US 11,213,792 B2
(45) Date of Patent: Jan. 4, 2022

(54) SPIRAL-WOUND TYPE GAS SEPARATION MEMBRANE ELEMENT, GAS SEPARATION MEMBRANE MODULE, AND GAS SEPARATION DEVICE

(71) Applicant: SUMITOMO CHEMICAL COMPANY, LIMITED, Tokyo (JP)

(72) Inventors: Takenori Kitaura, Osaka (JP); Yudai Ota, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 279 days.

(21) Appl. No.: 16/605,425

(22) PCT Filed: Sep. 21, 2018

(86) PCT No.: PCT/JP2018/035025
§ 371 (c)(1),
(2) Date: Oct. 15, 2019

(87) PCT Pub. No.: WO2019/065493
PCT Pub. Date: Apr. 4, 2019

(65) Prior Publication Data
US 2020/0122090 A1 Apr. 23, 2020

(30) Foreign Application Priority Data

Sep. 29, 2017 (JP) ............................. JP2017-191059

(51) Int. Cl.
*B01D 53/22* (2006.01)
*B01D 63/10* (2006.01)
(Continued)

(52) U.S. Cl.
CPC ........... *B01D 63/10* (2013.01); *B01D 53/228* (2013.01); *B01D 69/02* (2013.01); *B01D 69/12* (2013.01);
(Continued)

(58) Field of Classification Search
CPC ........ B01D 69/12; B01D 69/02; B01D 63/10; B01D 53/228; H01M 2008/1293; H01M 8/12
See application file for complete search history.

(56) References Cited

U.S. PATENT DOCUMENTS 6,161,435 A * 12/2000 Bond ................... B01D 61/12
  210/785
8,231,013 B2 * 7/2012 Chu ..................... B01D 69/12
  210/500.1
(Continued)

FOREIGN PATENT DOCUMENTS

JP  2009-503789 A  1/2009
JP  2009-195900 A  9/2009
(Continued)

OTHER PUBLICATIONS

Lu Zixing et al., "Approximate Nonlinear Constitutive Relation of Foamed Plastics With Higher Porosity", Polymeric Materials Science and Engineering, vol. 12, No. 5, Sep. 30, 1996, with English Abstract.
(Continued)

*Primary Examiner* — Anthony R Shumate
(74) *Attorney, Agent, or Firm* — McDermott Will & Emery LLP

(57) ABSTRACT

A spiral-wound type gas separation membrane element includes a central tube and a laminate wound around the central tube. Laminate includes at least one structure where a feed-side flow path member, a gas separation membrane, and a permeate-side flow path member are superimposed in this order. Permeate-side flow path member has a thickness of 400 μm to 1300 μm. Gas separation membrane is a membrane where a hydrophilic resin composition layer, a porous layer, and a permeate-side surface layer are super-
(Continued)

imposed in this order. Permeate-side surface layer faces Permeate-side flow path member and has a Young's modulus of 20 MPa to 400 MPa.

11 Claims, 7 Drawing Sheets

(51) Int. Cl.
    *B01D 69/02*     (2006.01)
    *B01D 69/12*     (2006.01)
    *H01M 8/12*     (2016.01)
    *H01M 8/124*     (2016.01)

(52) U.S. Cl.
    CPC ...... *H01M 8/12* (2013.01); *H01M 2008/1293* (2013.01)

(56) References Cited

U.S. PATENT DOCUMENTS

| | | | |
|---|---|---|---|
| 8,496,825 B1 * | 7/2013 | Jons | B29D 99/005 210/321.83 |
| 10,092,880 B2 | 10/2018 | Okubo et al. | |
| 2008/0209876 A1 * | 9/2008 | Miller | H01M 10/052 55/522 |
| 2009/0189617 A1 * | 7/2009 | Burns | E21B 43/24 324/649 |
| 2009/0260823 A1 * | 10/2009 | Prince-Wright | E21B 36/04 166/302 |
| 2010/0239924 A1 | 9/2010 | McElroy et al. | |
| 2011/0232061 A1 * | 9/2011 | Jons | B01D 67/00 29/426.2 |
| 2012/0285882 A1 * | 11/2012 | Teoh | B01D 69/06 210/500.22 |
| 2014/0231333 A1 * | 8/2014 | Kelada | B01D 63/021 210/323.2 |
| 2016/0001236 A1 * | 1/2016 | Hoek | C07C 247/18 210/654 |
| 2016/0151740 A1 | 6/2016 | Ouchi et al. | |
| 2017/0015790 A1 * | 1/2017 | Bell | C09D 145/00 |
| 2018/0133654 A1 | 5/2018 | Kodama et al. | |
| 2018/0178166 A1 | 6/2018 | Okubo et al. | |
| 2019/0039027 A1 * | 2/2019 | Griggs | B01D 67/0013 |
| 2020/0215494 A1 * | 7/2020 | Griggs | B01D 67/0013 |

FOREIGN PATENT DOCUMENTS

| | | |
|---|---|---|
| JP | 2015-027651 A | 2/2015 |
| JP | 2015-066488 A | 4/2015 |
| JP | 2016-115495 A | 6/2016 |
| JP | 2017-134948 A | 8/2017 |
| WO | 2007/014127 A2 | 2/2007 |
| WO | 2016/194832 A1 | 12/2016 |
| WO | 2016/194833 A1 | 12/2016 |

OTHER PUBLICATIONS

Chinese Office Action issued in corresponding Chinese Patent Application No. 201880032591.7, dated Jun. 2, 2021, with English translation.
European Office Action issued in corresponding European Patent Application No. 18863682.3-1104, dated Jan. 18, 2021.
Korean Office Action issued in corresponding to Korean Patent Application No. 10-2019-7033440, dated Dec. 29, 2020, with English translation.
International Search Report issued in corresponding International Patent Application No. PCT/JP2018/035025, dated Dec. 25, 2018, with Engish translation.
Japanese Notice of Grounds of Rejection issued in corresponding Japanese Patent Application No. 2019-532148, dated Aug. 27, 2019, with English translation.
Extended European Search Report issued in corresponding European Patent Application No. 18863682.3-1104, dated Apr. 19, 2021.

* cited by examiner

SPIRAL-WOUND TYPE GAS SEPARATION MEMBRANE ELEMENT, GAS SEPARATION MEMBRANE MODULE, AND GAS SEPARATION DEVICE

CROSS REFERENCE TO RELATED APPLICATIONS

This application is the U.S. National Phase under 35 U.S.C. § 371 of International Application No. PCT/JP2018/035025 filed on Sep. 21, 2018, which claims the benefit of Japanese Application No. 2017-191059, filed on Sep. 29, 2017, the entire contents of each are hereby incorporated by reference.

TECHNICAL FIELD

The present invention relates to a spiral-wound type gas separation membrane element, a gas separation membrane module, and a gas separation device.

BACKGROUND ART

Fuel cells cause hydrogen and oxygen to electrochemically react with each other, to convert chemical energy into electrical energy, and have high energy utilization efficiency, whereby the fuel cells are expected to be used in various fields.

As fuel gases for fuel cells, hydrogen-containing gases are conventionally used, which are obtained by using various hydrocarbons such as methane gas, natural gas (city gas), propane gas, LPG, GTL synthetic liquid fuel, light oil, heavy oil, kerosene, and naphtha as raw materials, and reforming the hydrocarbons according to a steam reforming method (SR method), an autothermal reforming method (ATR method), or a complex reforming method obtained by combining the methods and the like in the presence of a catalyst. The hydrogen-containing gas is obtained, for example, as a mixed gas of hydrogen and carbon monoxide according to a steam reforming reaction represented by the following formula (3) when using methane as a raw material, or is obtained by subjecting the carbon monoxide to a CO conversion reaction represented by the following formula (4) as necessary.

$$CH_4 + H_2O \rightarrow CO + 3H_2 \quad (3)$$

$$CO + H_2O \rightarrow CO_2 + H_2 \quad (4)$$

The fuel gas is supplied to an anode of the fuel cell, where the fuel gas reacts with oxygen to convert hydrogen to steam, and convert carbon monoxide to carbon dioxide, which is discharged as an anode off-gas. The anode off-gas also contains unreacted hydrogen and carbon monoxide.

In recent years, various methods for improving the efficiency of a fuel cell system have been studied. In Japanese Patent Publication No. 2009-503789 (Patent Literature 1), a method for increasing the efficiency of a fuel cell system is described, in which a fuel gas utilization rate is improved by removing steam and carbon dioxide from an anode off-gas and reusing the resulting anode off-gas as a fuel gas for a fuel cell. Patent Literature 1 discloses a partial pressure swing adsorption unit, a temperature swing adsorption unit, and an electrochemical pump as a device for removing steam and carbon dioxide from the anode off-gas.

CITATION LIST

Patent Literature

PTL 1: Japanese Patent Publication No. 2009-503789

SUMMARY OF INVENTION

Technical Problem

It is an object of the present invention to provide a spiral-wound type gas separation membrane element and a gas separation membrane module that are useful for a gas separation device for removing steam and carbon dioxide from an anode off-gas of a fuel cell, and have a simple configuration, and a gas separation device including the spiral-wound type gas separation membrane element or the gas separation membrane module.

Solution to Problem

The present invention provides the following spiral-wound type gas separation membrane element, gas separation membrane module, and gas separation device.

[1] A spiral-wound type gas separation membrane element including
a central tube; and
a laminate wound around the central tube,
in which
the laminate includes at least one structure where a feed-side flow path member, a gas separation membrane, and a permeate-side flow path member are superimposed in this order,
the permeate-side flow path member has a thickness of 400 μm to 1300 μm,
the gas separation membrane is a membrane where a hydrophilic resin composition layer, a porous layer, and a permeate-side surface layer are superimposed in this order, and
the permeate-side surface layer faces the permeate-side flow path member and has a Young's modulus of 20 MPa to 400 MPa.

[2] The spiral-wound type gas separation membrane element according to [1],
in which
the gas separation membrane further includes a feed-side surface layer opposite to the permeate-side surface layer, and
the feed-side surface layer has a Young's modulus of 20 MPa to 1200 MPa.

[3] The spiral-wound type gas separation membrane element according to [1] or [2], in which the central tube has a sweep gas supply port, and is in communication with a permeate-side flow path formed by the permeate-side flow path member.

[4] The spiral-wound type gas separation membrane element according to any one of [1] to [3], in which the hydrophilic resin composition layer contains a hydrophilic resin and a carrier capable of reversibly reacting with a specific gas.

[5] A gas separation membrane module including a housing including at least one spiral-wound type gas separation membrane element according to any one of [1] to [4].

[6] A gas separation device including at least one gas separation membrane module according to [5].

[7] The gas separation device according to [6],
in which
the central tube of the spiral-wound type gas separation membrane element includes a sweep gas supply port, and
the gas separation device includes a sweep gas supply flow rate regulator regulating a flow rate of a sweep gas supplied from the sweep gas supply port to the central tube.

[8] The gas separation device according to [7], in which the sweep gas supply port is connected to at least one selected from the group consisting of a cathode off-gas discharge port of a fuel cell device, an air supplier, a steam supplier, a fuel gas supplier, and an exhaust gas discharge port.

[9] The gas separation device according to any one of [6] to [8], including:
a feed gas supply port in communication with a feed-side flow path formed by the feed-side flow path member; and
a permeate gas discharge port in communication with a permeate-side flow path formed by the permeate-side flow path member.

[10] The gas separation device according to [9], in which the feed gas supply port is connected to an anode off-gas discharge port of the fuel cell device.

[11] The gas separation device according to [8] or [10], in which the fuel cell device is a solid oxide fuel cell device.

Advantageous Effect of Invention

The present invention can provide a spiral-wound type gas separation membrane element that is useful for a gas separation device for removing steam and carbon dioxide from an anode off-gas of a fuel cell device, and has a simple configuration.

BRIEF DESCRIPTION OF DRAWINGS

FIGS. 4A and 4B show the developed spiral-wound type gas separation membrane element according to the present invention as an example, in which FIGS. 4A and 4B are respectively a schematic cross-sectional view and schematic plan view thereof.

DESCRIPTION OF EMBODIMENTS

Hereinafter, embodiments of the present invention will be described in detail. However, the present invention is not limited to the embodiments, and various modifications can be made within the described scope. Embodiments obtained by combining technical means disclosed in different embodiments are also encompassed within the technical scope of the present invention.

(1) Spiral-Wound Type Gas Separation Membrane Element

A spiral-wound type gas separation membrane element (hereinafter, sometimes referred to simply as a "gas separation membrane element") according to the present invention includes a central tube and a wound body (laminate) wound around the central tube. The wound body includes at least one structure in which a feed-side flow path member, a gas separation membrane, and a permeate-side flow path member are superimposed in this order. The gas separation membrane causes a specific gas in a feed gas flowing through the feed-side flow path member to permeate therethrough, and introduces the specific gas to the permeate-side flow path member. The permeate-side flow path member introduces a permeate gas permeating through the gas separation membrane to the central tube. In the gas separation membrane element according to the present invention, the laminate preferably includes a separation membrane-and-feed-side flow path member complex (membrane leaf). Hereinafter, embodiments of the gas separation membrane element will be described in detail with reference to the drawings.

Figure 1:
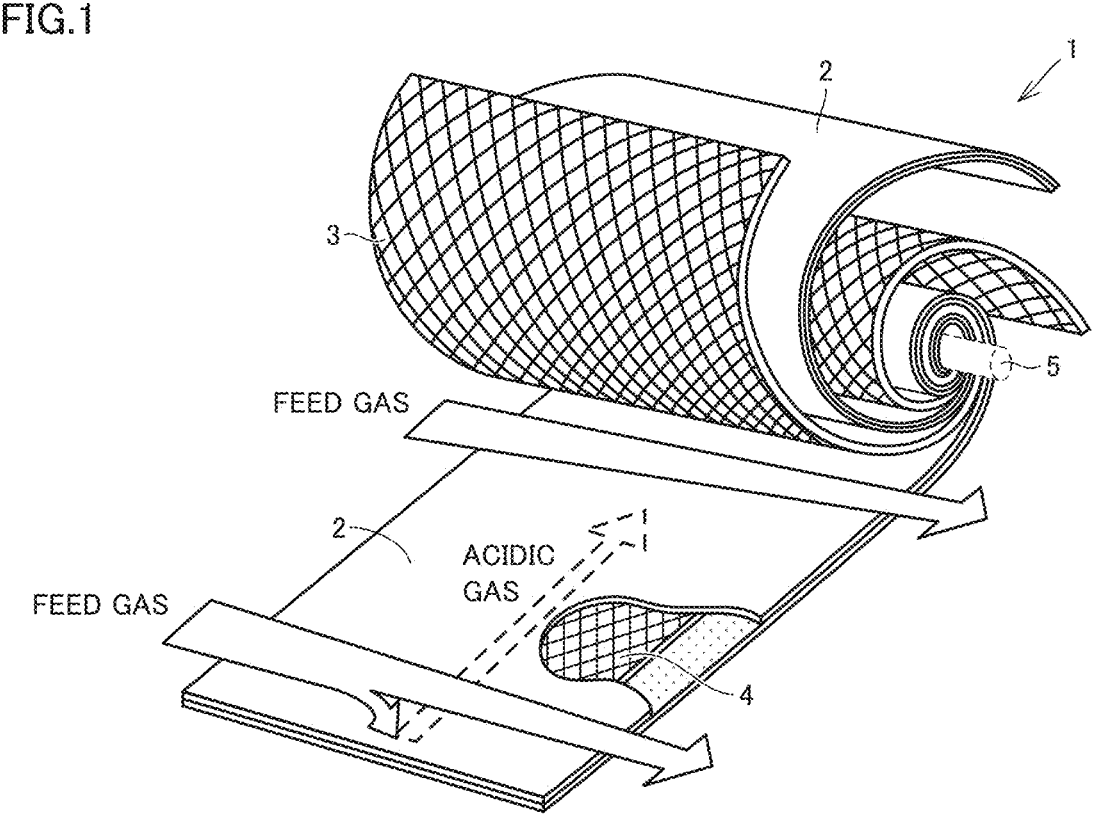
FIG. 1 is a schematic perspective view showing a developed spiral-wound type gas separation membrane element according to the present invention as an example, in which a partially cutout portion is provided.
Figure 2:
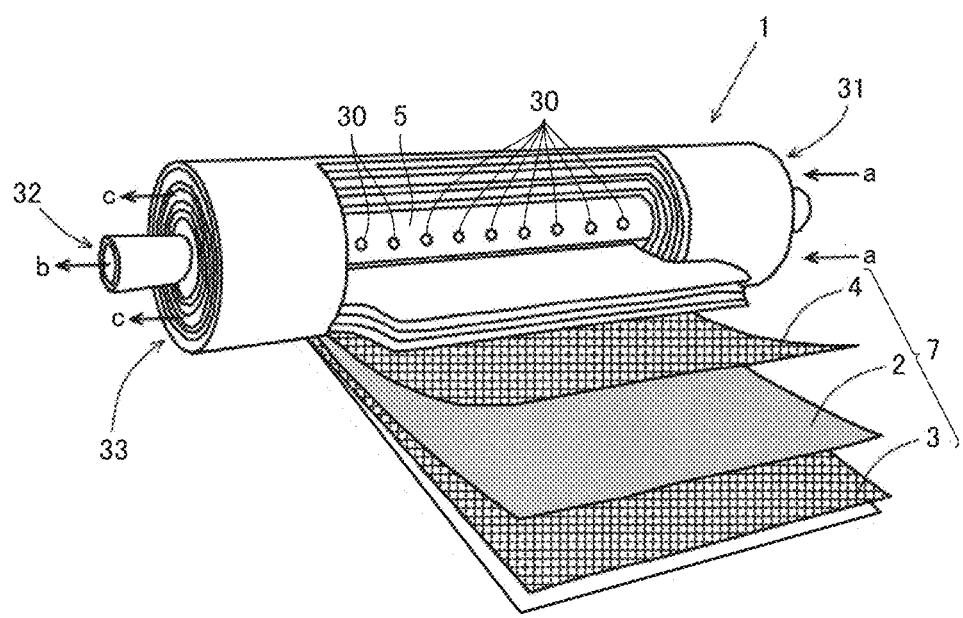
FIG. 2 is a schematic perspective view showing the gas separation membrane element according to the present invention as an example, in which a partially developed portion is provided.
Figure 3:
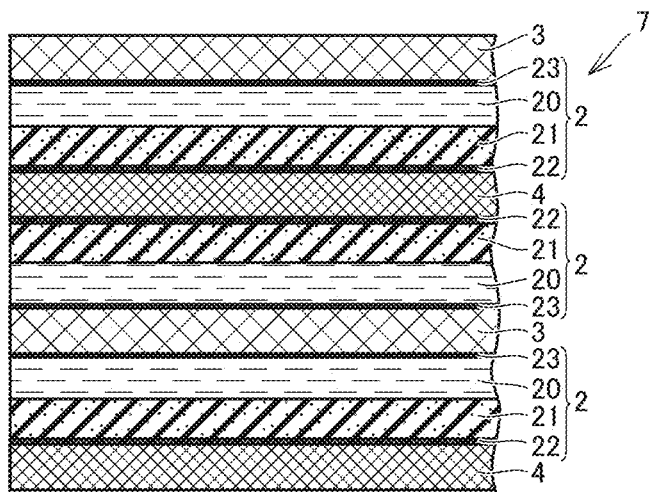
FIG. 3 is a schematic cross-sectional view illustratively showing a part of a wound body (laminate) constituting the spiral-wound type gas separation membrane element according to the present invention.

FIG. 1 is a schematic perspective view showing a developed gas separation membrane element 1 as an example, in which a partially cutout portion is provided. FIG. 2 is a schematic perspective view showing gas separation membrane element 1 as an example, in which a partially developed portion is provided. FIG. 3 is a schematic cross-sectional view illustratively showing a part of a wound body (laminate) constituting gas separation membrane element 1 as an example of the gas separation membrane element, The layer structures of the gas separation membrane element and wound body (laminate) shown in FIGS. 1 to 3 are exemplified, and the present invention is not limited to these examples.

As shown in FIGS. 1 and 2, gas separation membrane element 1 includes at least one gas separation membrane 2, at least one feed-side flow path member 3, and at least one permeate-side flow path member 4. A laminate 7 is obtained by laminating them. Gas separation membrane element 1 may include a wound body obtained by winding laminate 7 around a central tube 5. The wound body may have any shape such as a cylindrical shape or a rectangular cylindrical shape. However, the wound body preferably has a cylindrical shape since the wound body is enclosed in a cylindrical housing (container).

Gas separation membrane element 1 may further include a fixing member (not shown) such as an outer peripheral tape or an anti-telescoping device (ATD) in order to prevent the wound body from rewinding or the collapse of winding. In order to secure strength against a load due to internal pressure and external pressure on gas separation membrane element 1, an outer wrap (reinforcing layer) may be provided on the outermost periphery of the wound body. The outer peripheral tape is wound around the outer periphery of the wound body, so that it is possible to suppress the rewinding of the wound body. The anti-telescoping device is attached to each end of the wound body, and it is possible to suppress the occurrence of a winding collapse (telescope) phenomenon in the wound body during the use of gas separation membrane element 1. As the outer wrap (reinforcing layer), a reinforcing material such as a fiber-reinforced resin made of glass fibers impregnated with an epoxy resin may be used. It is preferable that the reinforcing material is wound around the outermost periphery of the wound body, and the epoxy resin is then cured.

<Wound Body>

As shown in FIG. 3, the wound body forming gas separation membrane element 1 may be composed of, for example, laminate 7 including at least one structure in which permeate-side flow path member 4, gas separation membrane 2, feed-side flow path member 3, and gas separation membrane 2 are superimposed in this order toward the outer peripheral direction of the wound body from the side of central tube 5. The number of gas separation membranes 2 laminated in the wound body is not limited as long as the number is 1 or more, and the total membrane area of gas separation membranes 2 is increased by increasing the number of gas separation membranes 2 laminated, to allow the amount of a gas treated with one gas separation membrane element to be increased. The number of gas separation membranes 2 laminated may be, for example, less than or equal to 60, and is preferably less than or equal to 50, and more preferably less than or equal to 40 from the viewpoint of the ease of assembly.

Figure 4A:
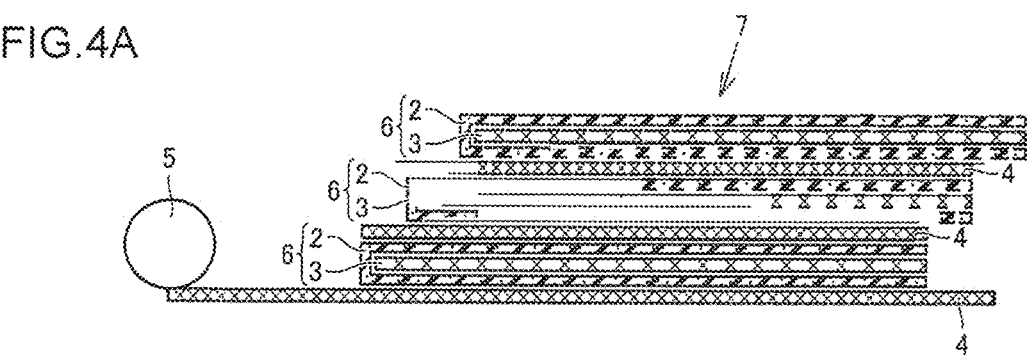
Figure 4B:
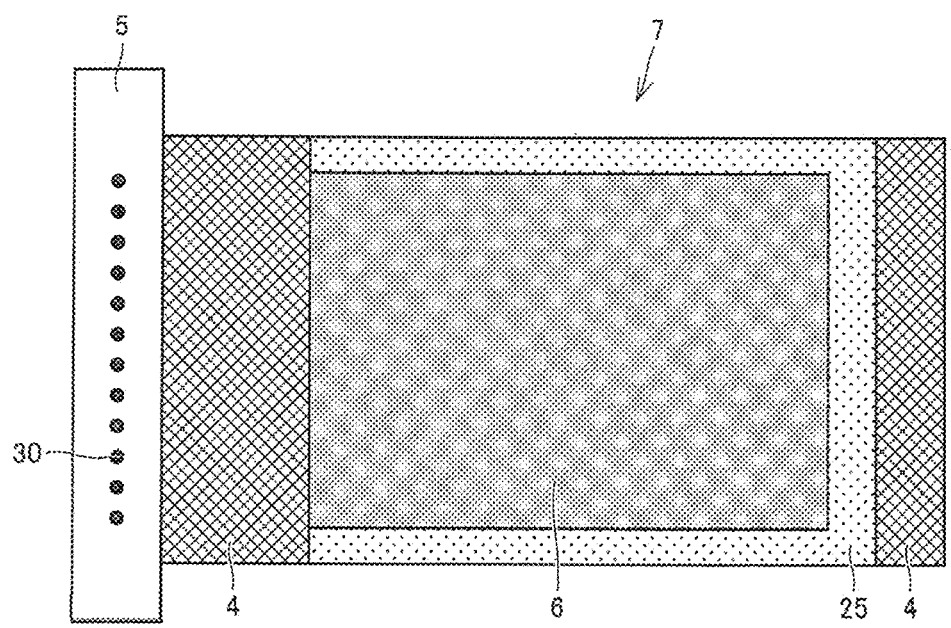

As shown in FIGS. 4A and 4B, permeate-side flow path member 4 is laminated so as to be sandwiched between two gas separation membranes 2 except for permeate-side flow path member 4 whose one end is connected to the outer wall of central tube 5. Therefore, since permeate-side flow path members 4 are wound around central tube 5 in the laminated state as described above, the number of permeate-side flow path members 4 laminated in the wound body is half of that of gas separation membranes 2 laminated. Feed-side flow path member 3 is superimposed so as to be sandwiched between two gas separation membranes 2. Therefore, since feed-side flow path members 3 are wound around central tube 5 in the superimposed state as described above, the number of feed-side flow path members 3 laminated is half of that of gas separation membranes 2 laminated. When the number of gas separation membranes 2 laminated is 40, the number of permeate-side flow path members 4 laminated and the number of feed-side flow path members 3 laminated are 20. For gas separation membrane 2, permeate-side flow path member 4, and feed-side flow path member 3 in "the number laminated" referred to herein, one structure in which feed-side flow path member 3, gas separation membrane 2, and permeate-side flow path member 4 are superimposed in this order is counted as one, and even one member composed of multiple layers is counted as one.

The membrane area per gas separation membrane 2 is not particularly limited, and is, for example, greater than or equal to 0.01 m$^2$ and less than or equal to 1000 m$^2$, preferably greater than or equal to 0.1 m$^2$ and less than or equal to 100 m$^2$, and more preferably greater than or equal to 0.5 m$^2$ and less than or equal to 5 m$^2$.

Gas separation membrane 2 is a membrane in which a hydrophilic resin composition layer 20, a porous layer 21 including a porous body, and a permeate-side surface layer 22 are laminated in this order. Gas separation membrane 2 preferably further includes a feed-side surface layer 23 on a surface opposite to permeate-side surface layer 22. Porous layer 21 is provided for the purpose of supporting or protecting hydrophilic resin composition layer 20, and is usually provided adjacent to hydrophilic resin composition layer 20. Gas separation membrane 2 may include two porous layers 21, and a hydrophilic resin composition layer sandwiched between two porous layers 21. Permeate-side surface layer 22 is provided for the purpose of reinforcing porous layer 21, and usually includes a porous body. Feed-side surface layer 23 is provided for the purpose of protecting the surface of hydrophilic resin composition layer 20, and usually includes a porous body.

Feed-side flow path member 3 is a member to which a feed gas is supplied, and the feed gas is supplied to gas separation membrane 2 through the member. Gas separation membrane 2 causes a specific gas in the feed gas flowing through feed-side flow path member 3 to permeate therethrough, and introduces the specific gas to permeate-side flow path member 4. Permeate-side flow path member 4 introduces a permeate gas containing the specific gas to central tube 5. Central tube 5 collects the permeate gas flowing through permeate-side flow path member 4.

The feed gas means a gas supplied to gas separation membrane element 1. When the specific gas for which hydrophilic resin composition layer 20 of gas separation membrane 2 exhibits selective permeability is an acidic gas, the feed gas contains at least the acidic gas. The above-mentioned permeate gas means a gas that has permeated through gas separation membrane 2 of gas separation membrane element 1, and contains at least part of the acidic gas. Here, the acidic gas means a gas exhibiting acidity such as carbon dioxide ($CO_2$), hydrogen sulfide ($H_2S$), carbonyl sulfide, sulfur oxide ($SO_x$), nitrogen oxide ($NO_x$), or hydrogen halide such as hydrogen chloride. When the permeate gas is resupplied to gas separation membrane element 1, the permeate gas may be part of the feed gas supplied to gas separation membrane element 1.

<Separation Membrane-and-Feed-Side Flow Path Member Complex>

Laminate 7 constituting the wound body includes a separation membrane-and-feed-side flow path member complex (membrane leaf). The separation membrane-and-feed-side flow path member complex includes gas separation membranes 2 facing each other, and feed-side flow path member 3 sandwiched between gas separation membranes 2 facing each other. Gas separation membranes 2 facing each other may be a bent separation membrane formed by doubling up one gas separation membrane, or may be a combined separation membrane formed by combining two gas separation membranes so as to face each other. Gas separation membrane 2 facing each other is formed with hydrophilic resin composition layer 20 placed inside.

<Gas Separation Membrane>

Hydrophilic resin composition layer 20 contained in gas separation membrane 2 constituting the separation membrane-and-feed-side flow path member complex has selective permeability for the specific gas in order to separate the specific gas contained in the feed gas flowing through feed-side flow path member 3 and cause the specific gas to permeate therethrough. In gas separation membrane 2, in addition to a solution/diffusion mechanism using a difference between the solubility of gas molecules in the membrane and the diffusivity in the membrane, a carrier capable of reversibly reacting with a specific gas is added to hydrophilic resin composition layer 20 contained in gas separation membrane 2, whereby the high selective permeability for the specific gas can be realized by a facilitated transport mechanism that forms a reaction product of the specific gas with the carrier to facilitate the permeation of the specific gas.

In the following reaction formula (1), the specific gas for which hydrophilic resin composition layer 20 of gas separation membrane 2 exhibits selective permeability is $CO_2$ as an acidic gas, and a reaction of $CO_2$ with a $CO_2$ carrier when cesium carbonate ($Cs_2CO_3$) is used as a carrier ($CO_2$ carrier) is shown. The symbol "↔" in the reaction formula (1) indicates that this reaction is a reversible reaction.

$$CO_2 + Cs_2CO_3 + H_2O \leftrightarrow 2CsHCO_3 \qquad (1)$$

As shown by the above reaction formula (1), water is necessary for the reversible reaction of $CO_2$ and the $CO_2$ carrier.

(Hydrophilic Resin Composition Layer)

Hydrophilic resin composition layer 20 exhibits selective permeability for a specific gas in gas separation membrane 2, and has a function of causing the specific gas to permeate therethrough. As described above, when the specific gas is $CO_2$ as an acidic gas, and the $CO_2$ carrier is used, it is preferable that hydrophilic resin composition layer 20 is a gel-like thin membrane that contains a hydrophilic resin composition containing a $CO_2$ carrier capable of reversibly reacting with $CO_2$ in the feed gas, and a hydrophilic resin serving as a medium holding the $CO_2$ carrier and moisture. The thickness of hydrophilic resin composition layer 20 may be appropriately selected depending on separation performance required for gas separation membrane 2, and it is usually preferably within a range of 0.1 µm to 600 µm, more preferably within a range of 0.5 µm to 400 µm, and particularly preferably within a range of 1 µm to 200 µm.

As the hydrophilic resin contained in hydrophilic resin composition layer 20, for example, when the specific gas for which gas separation membrane 2 exhibits selective permeability is $CO_2$ as an acidic gas, as shown in the above reaction formula (I), moisture is required for the reversible reaction between $CO_2$ and a $CO_2$ carrier, so that it is preferable that the hydrophilic resin has a hydrophilic group such as a hydroxyl group or an ion exchange group. It is more preferable that the hydrophilic resin contains a crosslinking-type hydrophilic resin in which molecular chains are crosslinked to form a network structure, exhibiting high water-holding properties. Since a pressure difference is applied as a driving force for the permeation of a specific gas through gas separation membrane 2, it is preferable to use a hydrophilic resin containing the crosslinking-type hydrophilic resin also from the viewpoint of pressure resistance strength required for gas separation membrane 2.

It is preferable that the polymer forming the hydrophilic resin preferably has, for example, a structural unit derived from an alkyl acrylate, an alkyl ester methacrylate, a vinyl ester of a fatty acid, or a derivative thereof. Examples of such polymers having hydrophilicity include polymers obtained by polymerizing monomers such as acrylic acid, itaconic acid, crotonic acid, methacrylic acid, and vinyl acetate.

Specific examples thereof include resins having a carboxyl group as an ion exchange group, such as a polyacrylic acid resin, a polyitaconic acid resin, a polycrotonic acid resin, and a polymethacrylic acid resin; a polyvinyl alcohol resin having a hydroxy group; and copolymers thereof such as an acrylic acid-vinyl alcohol copolymer resin, an acrylic acid-methacrylic acid copolymer resin, an acrylic acid-methyl methacrylate copolymer resin, and a methacrylic acid-methyl methacrylate copolymer resin. Among them, a polyacrylic acid resin that is a polymer of acrylic acid, a polymethacrylic acid resin that is a polymer of methacrylic acid, a polyvinyl alcohol resin obtained by hydrolyzing a polymer of vinyl acetate, an acrylate-vinyl alcohol copolymer resin obtained by saponifying a copolymer of methyl acrylate and vinyl acetate, and an acrylic acid-methacrylic acid copolymer resin that is a copolymer of acrylic acid and methacrylic acid are more preferable, and polyacrylic acid and an acrylate-vinyl alcohol copolymer resin are still more preferable.

The crosslinking-type hydrophilic resin may be prepared by causing a polymer exhibiting hydrophilicity to react with a crosslinking agent, or may also be prepared by copolymerizing a monomer that serves as the raw material of the polymer exhibiting hydrophilicity with a crosslinkable monomer. The crosslinking agent or the crosslinkable monomer is not particularly limited, and a conventionally known crosslinking agent or crosslinkable monomer can be used.

Examples of the crosslinking agent include conventionally known crosslinking agents such as an epoxy crosslinking agent, polyvalent glycidyl ether, a polyhydric alcohol, a polyvalent isocyanate, a polyvalent aziridine, a haloepoxy compound, a polyvalent aldehyde, a polyvalent amine, an organometallic crosslinking agent, and a metallic crosslinking agent. Examples of the crosslinkable monomer include conventionally known crosslinkable monomers such as divinylbenzene, N,N'-methylenebisacrylamide, trimethylolpropane triallylether, and pentaerythritol tetraallylether. As a crosslinking method, it is possible to use conventionally known techniques such as thermal crosslinking, ultraviolet crosslinking, electron beam crosslinking, radiation crosslinking, and photo-crosslinking as well as methods described in Japanese Patent Laying-Open Nos. 2003-268009 and H07-88171.

A carrier is a substance capable of reversibly reacting with a specific gas in a feed gas. By adding the carrier, the function of hydrophilic resin composition layer 20 for supplying the specific gas in the feed gas to permeate-side flow path member 4 can be promoted. At least one kind of the carrier is present in hydrophilic resin composition layer 20 containing a hydrophilic resin, and the carrier can reversibly react with a specific gas dissolved in water present in hydrophilic resin composition layer 20, whereby the specific gas is caused to selectively permeate therethrough. Specific examples of a substance that functions as a carrier and reversibly reacts with an acidic gas include, in the case where the acidic gas is carbon dioxide, alkali metal carbonates, alkali metal bicarbonates, alkanolamine (for example, described in Japanese Patent No. 2086581 and the like), and alkali metal hydroxides (for example, described in WO 2016/024523 and the like); in the case where the acidic gas is sulfer oxide, sulfur-containing compounds, citrates of alkali metals, and transition metal complexes (for example, described in Japanese Patent No. 2879057 and the like); and in the case where the acidic gas is nitrogen oxide, alkali metal nitrites and transition metal complexes (for example, described in Japanese Patent No. 2879057 and the like).

Hydrophilic resin composition layer 20 may also contain, for example, a hydration reaction catalyst for the acidic gas, a surfactant to be described later and the like as an additive in addition to the hydrophilic resin and the carrier reversibly reacting with a specific gas. When the specific gas exhibiting selective permeability in gas separation membrane 2 is an acidic gas, the reaction rate with the carrier capable of reversibly reacting with the acidic gas can be improved by using the hydration reaction catalyst for the acidic gas together. The hydration reaction catalyst for the acidic gas preferably contains an oxo acid compound, more preferably contains at least one elemental oxo acid compound selected from the group consisting of group 14 elements, group 15 elements, and group 16 elements, and still more preferably at least one selected from the group consisting of a tellurious acid compound, a selenious acid compound, an arsenious acid compound, and an orthosilicic acid compound.

(Porous Layer)

Gas separation membrane 2 includes porous layer 21 as shown in FIG. 3. Usually, porous layer 21 preferably has porosity having high gas permeability so as not to cause the diffusion resistance of a gas component that has permeated through hydrophilic resin composition layer 20. The porous layer 21 may have a single-layer structure or a laminated structure including two more layers. A member such as porous layer 21 constituting gas separation membrane 2 preferably has heat resistance depending on process conditions in a fuel cell system in which the application of gas separation membrane 2 is assumed. In the process of the fuel cell system, the operating temperature of gas separation membrane 2 is higher than or equal to 90° C., so that the heat resistance of the member such as porous layer 21 constituting gas separation membrane 2 is preferably higher than or equal to 90° C. Herein, the term "heat resistance" means that no curl occurs which can be visually confirmed due to heat shrinkage or heat melting even after the member such as porous layer 21 is stored for 2 hours under the temperature conditions equal to or greater than the process condition, so that a form before preservation is maintained.

Examples of porous materials constituting porous layer 21 include polyolefin resins such as polyethylene (PE) and polypropylene (PP); fluorine-containing resins such as polytetrafluoroethylene (PTFE), polyvinyl fluoride (PVF), and polyvinylidene fluoride (PVDF); polyester resins such as polyethylene terephthalate (PET), polyethylene naphthalate, and high-molecular-weight polyesters; resin materials such as polystyrene (PS), polyethersulfone (PES), polyphenylene sulfide (PPS), polysulfone (PSF), polyimide (PI), polyetherimide (PEI), polyetheretherketone (PEEK), heat-resistant polyamides, aramids, and polycarbonates; and inorganic materials such as metals, glasses, and ceramics. Among them, fluororesins and PP are more preferable.

The thickness of porous layer 21 is not particularly limited, and from the viewpoint of mechanical strength, usually, the thickness is preferably within a range of 10 μm to 3000 μm, more preferably within a range of 10 μm to 500 μm, and still more preferably within a range of 15 μm to 150 μm. The average pore size of the pores of porous layer 21 is not particularly limited, and the average pore size is preferably less than or equal to 10 μm, and more preferably within a range of 0.005 μm to 1.0 μm. The porosity of porous layer 21 is preferably within a range of 5% to 99%, and more preferably within a range of 30% to 90%.

Porous layer 21 indicates a member disposed on the permeate surface side of hydrophilic resin composition layer 20 of gas separation membrane 2. However, as with porous layer 21, the porous layer formed of the porous body may be arranged on the feed surface side of hydrophilic resin composition layer. In this case, in the layer configuration of gas separation membrane 2, for example, feed-side surface layer 23, the porous layer (feed side), hydrophilic resin composition layer 20, porous layer 21 (permeate side), and permeate-side surface layer 22 are sequentially provided from the feed-side flow path member side. The above description of porous layer 21 (permeate side) is applied to the porous layer (feed side).

(Surface Layer)

Gas separation membrane 2 includes permeate-side surface layer 22 as shown in FIG. 3. Permeate-side surface layer 22 is usually porous. By providing permeate-side surface layer 22, in the step of forming hydrophilic resin composition layer 20 on porous layer 21 in the manufacture of gas separation membrane 2, strength capable of withstanding a tensile load applied to porous layer 21 can be additionally applied, and strength capable of withstanding a pressure load and the like applied to gas separation membrane 2 can be additionally applied when the permeate gas is separated from the feed gas. Permeate-side surface layer 22 has a Young's modulus of 20 MPa to 400 MPa, and preferably 100 MPa to 400 MPa from the viewpoint of suppressing diffusion resistance to the permeate gas while adding strength to porous layer 21 to stably maintain high selective permeability for a specific gas (in other words, maintaining the high permeation flux of the specific gas). The Young's modulus may be 30 MPa to 300 MPa.

When permeate-side surface layer 22 is provided, porous layer 21 and permeate-side surface layer 22 may be integrated with each other. For the integration, conventionally known methods can be used. Specific examples thereof include a method for applying an adhesive or a pressure-sensitive adhesive, and a thermal fusion method. It is preferable that, when gas separation membrane 2 and gas separation membrane element 1 are manufactured, the tensile load provides strength preventing porous layer 21 and permeate-side surface layer 22 from being peeled off.

Herein, the Young's modulus of permeate-side surface layer 22 is measured as follows. Small pieces are cut into a dumbbell shape defined in JIS K6251-3 from permeate-side surface layer 22. Under environmental conditions of a temperature of 23° C. and a humidity of 50%, a small piece of a film is attached to an autograph apparatus, and is pulled at a constant speed of 50 mm/min. The Young's modulus is calculated from initial stress and strain. The measurement is performed three times, and the average value thereof is taken as Young's modulus.

Permeate-side surface layer 22 has pressure resistance strength and stretch resistance, and is not particularly limited as long as it has a structure and material having gas permeability. However, a material having heat resistance is preferable. For example, the same materials as those mentioned as materials constituting porous layer 21 can be suitably used. As permeate-side surface layer 22, for example, a porous body, a non-woven fabric, a woven fabric, a net and the like having an average pore size of 0.001 μm to 10 μm can be appropriately selected and used.

Gas separation membrane 2 preferably contains feed-side surface layer 23 as shown in FIG. 3. Feed-side surface layer 23 is usually porous. During the manufacture of gas separation membrane element 1, when the wound body is tightened, hydrophilic resin composition layer 20 and feed-side flow path member 3 may rub against each other. However, by providing feed-side surface layer 23, hydrophilic resin composition layer 20 is protected, and the occurrence of damage due to the rubbing can be suppressed. Feed-side surface layer 23 has a Young's modulus of 20 MPa to 1200 MPa, and preferably 200 MPa to 1000 MPa, from the viewpoint of suppressing the damage of hydrophilic resin composition layer 20 to stably maintain the high selective permeability for the specific gas. The Young's modulus of feed-side surface layer 23 is also a value measured by the same method as that in permeate-side surface layer 22.

Feed-side surface layer 23 is not particularly limited as long as it contains a material having less friction with feed-side flow path member 3 and good selective permeability for a specific gas. A material having heat resistance is preferable. For example, the same materials as those mentioned as materials constituting porous layer 21 can be suitably used. As feed-side surface layer 23, for example, a porous body, a non-woven fabric, a woven fabric, a net and the like having an average pore size of 0.001 μm to 10 μm can be appropriately selected and used. In particular, the porosity of feed-side surface layer 23 is preferably 20% to 80%, and more preferably lower than that of feed-side flow path member 3.

Permeate-side surface layer 22 and feed-side surface layer 23 may have a single-layer structure or a laminated structure including two more layers. The members such as permeate-side surface layer 22 and feed-side surface layer 23 constituting gas separation membrane 2 preferably have heat resistance according to process conditions in a fuel cell system in which the application of gas separation membrane 2 is assumed. In the process of the fuel cell system, the operating temperature of gas separation membrane 2 is higher than or equal to 90° C., so that the heat resistance of the members such as permeate-side surface layer 22 and feed-side surface layer 23 constituting gas separation membrane 2 is preferably higher than or equal to 90° C.

(Method for Producing Hydrophilic Resin Composition Layer)

The method for producing hydrophilic resin composition layer 20 may include the following three steps of a first step (coating solution producing step), a second step (coating step), and a third step (drying step). It is preferable to use a roll-to-roll type coater or dryer that carries out the second and third steps while continuously transferring the porous body.

In the first step (coating solution producing step), at least a hydrophilic resin, a carrier and a solvent are mixed to prepare a coating solution.

Examples of a medium include protic polar solvents such as water, and alcohols (such as methanol, ethanol, 1-propanol, or 2-propanol); nonpolar solvents such as toluene, xylene, and hexane; and aprotic polar solvents such as ketones (such as acetone, methyl ethyl ketone, and methyl isobutyl ketone), N-methylpyrrolidone, N,N-dimethylacetamide, and N,N-dimethylformamide. A single kind of medium may be used alone, or two or more kinds of media may be used in combination as long as they are compatible with each other. Among these, a medium containing at least one selected from the group consisting of water and alcohols (such as methanol, ethanol, 1-propanol, and 2-propanol) is preferable, and a medium containing water is more preferable.

The coating solution may contain a surfactant as necessary. When the surfactant is added to the coating solution and the coating solution is applied to the porous body, the surfactant is localized at the interface formed by the coating solution between hydrophilic resin composition layer 20 and the porous body, which provides improved wettability with the porous body, thereby allowing the unevenness and the like of the film thickness of hydrophilic resin composition layer 20 to be improved. The surfactant is not particularly limited, and, for example, conventionally known surfactants such as polyoxyethylene polyoxypropylene glycols, polyoxyethylene alkyl phenyl ethers, polyoxyethylene alkyl ethers, fluorine-based surfactants, and silicone-based surfactants can be used. A single kind of surfactant may be used alone, or two or more kinds of surfactants may be used in combination.

In the second step (coating step), the coating solution prepared in the first step is applied to one surface of the porous body to form a coating. The temperature of the coating solution in the second step may be appropriately determined depending on the composition and concentration of the coating solution. An excessively high temperature may, however, evaporate the medium from the coating solution in a large amount, possibly changing the composition and the concentration, and leaving a mark of evaporation in the coating. The temperature is thus preferably within a range of higher than or equal to 15° C., more preferably higher than or equal to room temperature (20° C.), and preferably lower than or equal to the boiling point of the medium in use by 5° C. For example, when water is used as the medium, the temperature of the coating solution in the second step is preferably within the temperature range of 15° C. to 95° C.

The method for applying the coating solution to the porous body is not particularly limited, and examples thereof include spin coating, bar coating, die coating, blade coating, air-knife coating, gravure coating, roll coating, spray coating, dip coating, Comma roll method, kiss coater method, screen printing, and inkjet printing. The application amount of the coating solution in a weight per unit area (solid content per unit area) is preferably within a range of 1 g/m² to 1000 g/m², more preferably within a range of 5 g/m² to 750 g/m², and still more preferably within a range of 10 g/m² to 500 g/m². The adjustment of the weight per unit area can be controlled on the basis of the speed of forming the coating (for example, the speed of transferring the porous body), the concentration of the coating solution, the discharge amount of the coating solution, and the like. The coating solution may be applied to the porous body in a stripe pattern or a dot pattern.

The porous body to which the coating solution is applied may be a member corresponding to porous layer 21 of gas separation membrane 2 in laminate 7 constituting the wound body, or may be a member corresponding to the porous layer (feed side) disposed on the feed surface side of hydrophilic resin composition layer 20 of gas separation membrane 2. When the coating solution is applied to the porous body corresponding to the porous layer (feed side) in the manufacture of gas separation membrane 2, a step of laminating a porous body corresponding to porous layer (permeate side) on a surface of hydrophilic resin composition layer 20 opposite to the porous layer (feed side) may be included. When the coating solution is applied to the porous body corresponding to porous layer 21, a step of laminating a porous body corresponding to the porous layer (feed side) on a surface of hydrophilic resin composition layer 20 opposite to porous layer 21 (permeate side) may be included.

The porous body to which the coating solution is applied may be a temporary coating member for forming hydrophilic resin composition layer 20. When the coating solution is applied to the temporary coating member, a step of peeling off formed hydrophilic resin composition layer 20 from the temporary coating member after a third step (drying step) to be described later, and a step of laminating peeled-off hydrophilic resin composition layer 20 on porous layer 21 (permeate side) or the porous layer (feed side) are included. Therefore, the temporary coating member may be a porous body that can peel off hydrophilic resin composition layer 20 formed on the temporary coating member without damaging hydrophilic resin composition layer 20. When peeled-off hydrophilic resin composition layer 20 is laminated on porous layer 21 (permeate side), a step of laminating a porous body corresponding to the porous layer (feed side) on the surface of hydrophilic resin composition layer 20 opposite to porous layer 21 (permeate side) may be included. When peeled-off hydrophilic resin composition layer 20 is laminated on the porous layer (feed side), a step of laminating a porous body corresponding to porous layer 21

(permeate side) on the surface of hydrophilic resin composition layer 20 opposite to the porous layer (feed side) may be included.

In the third step (drying step), the medium is removed from the formed coating. A method for removing the medium is not particularly limited, and a method is preferable in which heated air and the like are allowed to flow to evaporate the medium for removal, and the coating is dried. Specifically, for example, the medium may be evaporated from the coating for removal by putting the applied product (the porous body on which a coating has been formed) into an air flowing drying furnace adjusted to have a predetermined temperature and a predetermined humidity. The drying temperature of the coating may be appropriately determined depending on the medium for the coating solution and the kind of the porous body. Usually, the drying temperature is preferably higher than the freezing point of the medium and lower than the melting point of the material constituting the porous body. Normally, the drying temperature is suitably within a range of 80° C. to 200° C. Hydrophilic resin composition layer 20 is formed through the drying step in the third step. The concentration of the medium contained in resulting hydrophilic resin composition layer 20 is preferably 1% by weight to 34% by weight.

The second step and the third step may be repeated at least once on an exposed surface of hydrophilic resin composition layer 20 (a surface opposite to a surface in contact with the porous body) to laminate hydrophilic resin composition layer 20. This can suppress formation of a pinhole of hydrophilic resin composition layer 20 that may be caused by unevenness and the like of the coating formed by the application of the coating solution. When the second step and the third step are repeated, individual hydrophilic resin composition layers 20 may be laminated either under different coating conditions (such as the composition of the coating solution and the amount of the coating solution applied) and drying conditions or under identical coating conditions and drying conditions. By performing the first step, the second step, and the third step, hydrophilic resin composition layer 20 included in gas separation membrane element 1 can be manufactured.

When the porous body to which the coating solution is applied is a member corresponding to porous layer 21, permeate-side surface layer 22 may be bonded to a surface opposite to the surface to which the coating solution is applied, of the porous body to which the coating solution is applied in advance prior to the second step, using, for example, an adhesive, or may be bonded to the surface of the porous body using, for example, an adhesive after completing the third step. In the second step, the former is preferable from the viewpoint of being capable of imparting strength to the porous body.

Feed-side surface layer 23 may be laminated by bonding feed-side surface layer 23 to the surface of hydrophilic resin composition layer 20 using, for example, an adhesive, or by bringing feed-side surface layer 23 into contact with the surface of hydrophilic resin composition layer 20 without using an adhesive.

<Feed-Side Flow Path Member>

Feed-side flow path member 3 forms a flow path space (feed-side flow path) to which the feed gas is supplied, and the flow path space introduces the feed gas into the wound body to supply the feed gas to gas separation membrane 2. Feed-side flow path member 3 preferably has a function as a flow path material that forms a flow path space for the feed gas, and a function to reduce the pressure loss of the feed gas to be supplied while causing a turbulent flow in the feed gas to promote the surface renewal on the feed-side surface of gas separation membrane 2. From this viewpoint, the thickness of feed-side flow path member 3 is preferably within a range of 10 μm to 1500 μm, more preferably within a range of 50 μm to 1200 μm, and still more preferably within a range of 100 to 800 μm. From the same viewpoint, feed-side flow path member 3 preferably has a network shape (net-like, mesh-like, and the like). Depending on the network shape, the flow path for the feed gas changes. Therefore, the shape of the unit cell of the network in feed-side flow path member 3 is preferably selected according to the purpose, for example, from shapes such as a square, a rectangle, a rhombus, and a parallelogram.

The pressure loss of feed-side flow path member 3 is preferably within 10 kPa, and more preferably within 5 kPa, from the viewpoint of suppressing boosting energy when the feed gas is supplied.

Examples of materials constituting feed-side flow path member 3 include resins and inorganic materials such as metals, glass, and ceramics. It is preferable that the material constituting feed-side flow path member 3 has heat resistance according to the temperature conditions under which gas separation membrane 2 is used.

Examples of materials having high heat resistance include resin materials such as PE, PP, PTFE, PS, PPS, PES, PEEK, PI, and polycyclohexylene dimethylene terephthalate (PCT); inorganic materials such as metals, glass, and ceramics; and materials combining a resin material and an inorganic material.

It is preferable that feed-side flow path member 3 contains a layer formed of a non-woven fabric, a woven fabric, or a net containing at least one material selected from the group consisting of resins, metals, and glass. It is more preferable that feed-side flow path member 3 contains a layer formed of a non-woven fabric, a woven fabric, or a net containing at least one material selected from the group consisting of PE, PP, PTFE, PS, PPS, PES, PEEK, PI, PCT, metals, and glass. Feed-side flow path member 3 may have a single-layer structure or a laminated structure including two more layers. For example, feed-side flow path member 3 may have a structure obtained by laminating a plurality of layers formed of the above non-woven fabric, woven fabric, or net.

<Permeate-Side Flow Path Member>

Permeate-side flow path member 4 forms a flow path space (permeate-side flow path) through which a permeate gas that has permeated through gas separation membrane 2 flows. This flow path space introduces the permeate gas into central tube 5. It is preferable that permeate-side flow path member 4 has a function as a flow path material that forms a flow path space for the permeate gas, and a function to reduce the pressure loss of the permeate gas (in other words, a function to exhibit a high permeation flux of the permeate gas) while causing a turbulent flow in the permeate gas to promote the surface renewal on the permeate-side surface of gas separation membrane 2. From this viewpoint, the thickness of permeate-side flow path member 4 is 400 μm to 1300 μm, and preferably 600 μm to 1200 μm. From the same viewpoint, permeate-side flow path member 4 preferably has a network shape (net-like, mesh-like, and the like). Depending on the network shape, the flow path for the permeate gas changes. Therefore, the shape of the unit cell of the network in permeate-side flow path member 4 is preferably selected according to the purpose, for example, from shapes such as a square, a rectangle, a rhombus, and a parallelogram.

The pressure loss of permeate-side flow path member 4 is preferably within 10 kPa, and more preferably within 5 kPa, from the viewpoint of suppressing boosting energy when a sweep gas is supplied.

When gas separation membrane element 1 is used, the pressure of the permeate gas at a discharge port 32 of central tube 5 according to the pressure of the sweep gas and the pressure loss of permeate-side flow path member 4 and the like is preferably lower than the pressure of the feed gas.

The material constituting permeate-side flow path member 4 is not particularly limited. A material having heat resistance in the temperature conditions under which gas separation membrane 2 is used is preferable, and the same materials as the resin materials mentioned as the materials constituting porous layer 21 may be suitably used, for example. Specifically, PTFE, PES, PSF, PEEK, PI, and metals are preferable, and PTFE, PPS, PEEK, PP, and metals are more preferable. Permeate-side flow path member 4 may have a single-layer structure or a laminated structure including two more layers.

<Central Tube>

Central tube 5 is a conduit for collecting the permeate gas that has permeated through gas separation membrane 2 and discharging the same from gas separation membrane element 1. A material for central tube 5 is not particularly limited, and the material is preferably a material having heat resistance according to the temperature conditions under which gas separation membrane 2 is used. Since gas separation membrane 2 and the like are wound around the outer periphery a plurality of times to form a wound body, a material having mechanical strength is preferable. As the material for the central tube 5, for example, stainless steel and the like is suitably used. The diameter, length, and thickness of central tube 5 are appropriately set depending on the size of gas separation membrane element 1, the number of separation membrane-and-feed-side flow path member complexes 50 in laminate 7, the amount of the permeate gas, and the mechanical strength required for central tube 5, and the like.

Central tube 5 is preferably a circular tube when the wound body is in a cylindrical shape, and is preferably a square tube when the wound body is in a rectangular cylindrical shape.

As shown in FIG. 2, central tube 5 has a plurality of holes 30 on the outer peripheral surface of central tube 5. Holes 30 communicate between the flow path space for the permeate gas of permeate-side flow path member 4 (permeate-side flow path) and an inner hollow space of central tube 5. The number of holes 30 and size of holes 30 provided in central tube 5 are determined in consideration of the amount of the permeate gas supplied from permeate-side flow path member 4 or the mechanical strength required for central tube 5. For example, when the size of the holes provided in central tube 5 cannot be increased, the number of the holes provided in central tube 5 may be increased to secure the flow path of the permeate gas. Holes 30 provided in central tube 5 may be formed at equal intervals in the direction parallel to the axis of central tube 5, or may also be localized on one end side of central tube 5.

Central tube 5 may be used in a state where one end is closed and the other end is opened so that the permeate gas is led out from the other end, or may be used in a state where both the ends are opened so that the sweep gas is supplied from one end for promoting the flow of the permeate gas, and the permeate gas is ted out from the other end. Hereinafter, a configuration added when the sweep gas is supplied will be described.

<Configuration Added when Sweep Gas is Supplied>

Figure 5:
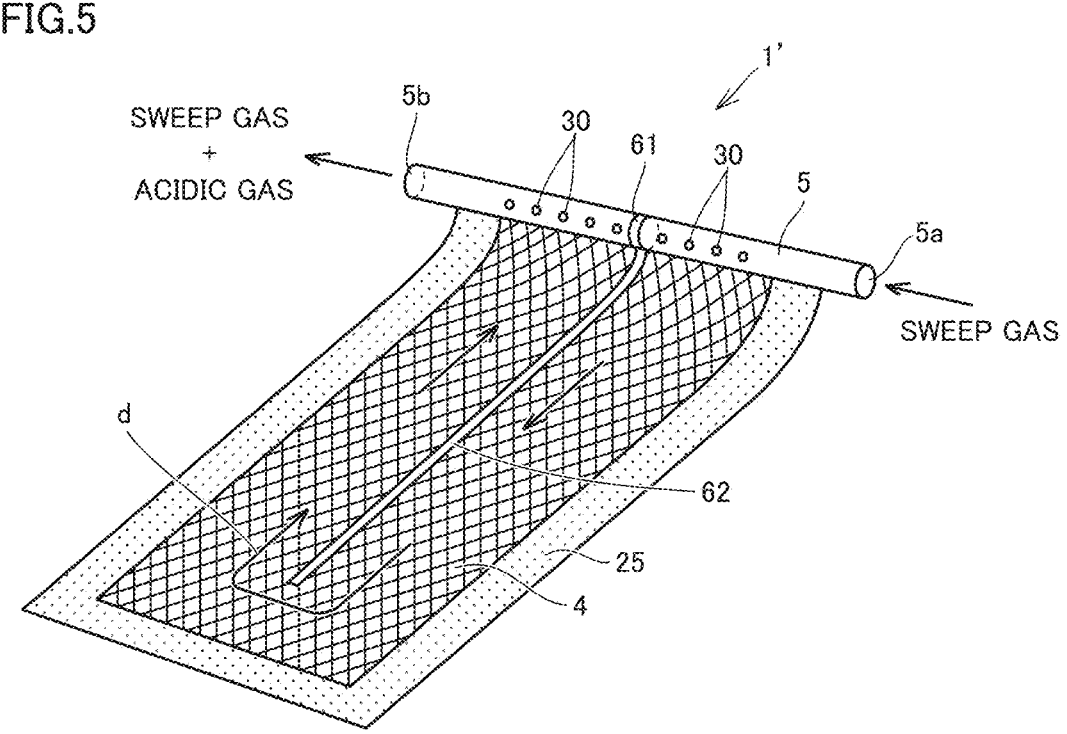
FIG. 5 is a schematic perspective view showing the developed part of a spiral-wound type gas separation membrane element according to the present invention as an example when a sweep gas is supplied.

FIG. 5 is a schematic perspective view showing a developed part of a spiral-wound type gas separation membrane element 1' as an example when a sweep gas is supplied. Spiral-wound type gas separation membrane element 1' and spiral-wound type gas separation membrane element 1 shown in FIG. 1 are different from each other only in that central tube 5 and permeate-side flow path member 4 shown in FIG. 5 have an additional configuration. The other configuration of spiral-wound type gas separation membrane element 1' is the same as that of spiral-wound type gas separation membrane element 1.

In FIG. 5, a blocking member 61 is provided in central tube 5, and a partition member 62 is extended in a direction orthogonal to central tube 5 at a position corresponding to blocking member 61 in permeate-side flow path member 4. Blocking member 61 and partition member 62 block gas permeation to define a gas flow path.

In gas separation membrane element a sweep gas supplied from one end 5a of central tube 5 is led out to permeate-side flow path member 4 from holes 30 provided between the end and blocking member 61. The sweep gas flows in the direction of an arrow d in the flow path defined by partition member 62, and reaches from holes 30 provided on the downstream side of blocking member 61 of central tube 5 into central tube 5. That is, one end 5a of central tube 5 functions as a sweep gas supply port, and the sweep gas supply port is in communication with the permeate-side flow path formed by permeate-side flow path member 4. The sweep gas flows in permeate-side flow path member 4 to promote the flow of the permeate gas in permeate-side flow path member 4. The permeate gas reaches central tube 5 together with the sweep gas, and is led out from another end 5b of central tube 5.

In gas separation membrane element 1', the position of blocking member 61 is not limited to the vicinity of the center of central tube 5 shown in FIG. 5. Blocking member 61 may be disposed so as to separate in central tube 5 the flow path of the sweep gas supplied to permeate-side flow path member 4 and the flow path of a mixed gas of the permeate gas and sweep gas collected from permeate-side flow path member 4 from each other.

The sweep gas is not particularly limited, and a gas containing at least one selected from the group consisting of a cathode off-gas of a fuel cell device, air, oxygen, carbon dioxide, steam, a fuel gas, and an exhaust gas can be used. That is, in gas separation membrane element 1', the sweep gas supply port may be configured to be connected to at least one selected from the group consisting of a cathode off-gas discharge port of a fuel cell device, an air supplier, a steam supplier, and an exhaust gas discharge port.

(2) Method for Manufacturing Spiral-Wound Type Gas Separation Membrane Element

Gas separation membrane element 1 can be manufactured as follows. Hereinafter, a method for manufacturing gas separation membrane element 1 will be described with reference to FIG. 4A and FIG. 4B. FIGS. 4A and 4B shows developed gas separation membrane element 1 as an example, in which FIGS. 4A and 4B are respectively a schematic cross-sectional view and schematic plan view thereof. In FIG. 4B, only lowermost permeate-side flow path member 4 (permeate-side flow path member 4 fixed to central tube 5) shown in FIG. 4A, and separation membrane-and-feed-side flow path member complex 50 laminated thereon are shown.

First, when a wound body is formed, an end (an end located on an inner peripheral side in the wound body) closer to central tube 5 in the ends of permeate-side flow path members 4 positioned at both ends in a direction orthogonal to the axis of central tube 5 is fixed to the outer peripheral surface of central tube 5 by using a pressure-sensitive adhesive tape, an adhesive or the like.

A plurality of separation membrane-and-feed-side flow path member complexes 50 are produced, each of which includes gas separation membranes facing each other and feed-side flow path member 3 sandwiched between the gas separation membranes facing each other.

When gas separation membrane 2 includes feed-side surface layer 23, the gas separation membranes facing each other may be formed so that feed-side surface layer 23 of gas separation membrane 2 is placed inside, to produce separation membrane-and-feed-side flow path member complex 50.

Next, one separation membrane-and-feed-side flow path member complex 50 is laminated on permeate-side flow path member 4 fixed to central tube 5. In this case, when a bent separation membrane is used, separation membrane-and-feed-side flow path member complex 50 is laminated so that a bent part of the bent separation membrane is directed to the central tube 5 side, and the bent part is disposed at a position separated from the outer peripheral surface of central tube 5.

Then, an adhesive is applied to an exposed surface of separation membrane-and-feed-side flow path member complex 50 laminated on permeate-side flow path member 4 (a surface opposite to permeate-side flow path member 4 in separation membrane-and-feed-side flow path member complex 50). Specifically, an adhesive is applied to both ends in a width direction (a direction parallel to central tube 5) and one end (a side far from central tube 5) in a length direction (a direction parallel to central tube 5) in separation membrane-and-feed-side flow path member complex 50.

On the exposed surface of separation membrane-and-feed-side flow path member complex 50 to which the adhesive has been applied, permeate-side flow path member 4 and separation membrane-and-feed-side flow path member complex 50 (hereinafter, sometimes referred to as "next permeate-side flow path member 4" and "next separation membrane-and-feed-side flow path member complex 50") are bonded and laminated in this order. At this time, the areas of next permeate-side flow path member 4 and next separation membrane-and-feed-side flow path member complex 50 are less than or equal to those of permeate-side flow path member 4 and separation membrane-and-feed-side flow path member complex 50 laminated in advance.

Next permeate-side flow path member 4 is preferably laminated so that an end close to central tube 5 among the ends positioned at both ends in the direction orthogonal to the axis of central tube 5 coincides with an end close to central tube 5 among the ends in the length direction of separation membrane-and-feed-side flow path member complex 50 laminated in advance.

Next separation membrane-and-feed-side flow path member complex 50 is laminated so as to be disposed at a position separated from the outer peripheral surface of central tube 5 with respect to next permeate-side flow path member 4.

When the above procedure is repeated to laminate permeate-side flow path member 4 and separation membrane-and-feed-side flow path member complex 50, there is formed a laminate 7 in which permeate-side flow path member 4 and separation membrane-and-feed-side flow path member complex 50 are laminated so that an end close to central tube 5 among the ends located at both ends in the direction orthogonal to the axis of central tube 5 is sequentially separated from central tube 5.

Thereafter, an adhesive is also applied to the exposed surface of separation membrane-and-feed-side flow path member complex 50 finally laminated in the same manner as described above to wind laminate 7 around central tube 5 so as to cover holes 30 of central tube 5 with permeate-side flow path member 4, thereby forming a wound body.

As described above, permeate-side flow path member 4 and separation membrane-and-feed-side flow path member complex 50 are laminated so as to be separated from central tube 5 at a predetermined interval, whereby the wound body can be formed so that the end parts on central tube 5 side, of permeate-side flow path member 4, next permeate-side flow path member 4, and separation membrane-and-feed-side flow path member complex 50, are arranged in the circumferential direction of central tube 5 at predetermined intervals when laminate 7 is wound around central tube 5. Accordingly, it is possible to cause central tube 5 to efficiently collect the permeate gas flowing through permeate-side flow path member 4.

The adhesive is not particularly limited as long as it can bond separation membrane-and-feed-side flow path member complex 50 and permeate-side flow path member 4. The adhesive is preferably a material having both heat resistance and moisture resistance according to the temperature and humidity conditions under which gas separation membrane 2 is used.

Examples of the adhesive include resins as adhesive components, such as epoxy resins, vinyl chloride copolymer resins, vinyl chloride-vinyl acetate copolymer resins, vinyl chloride-vinylidene chloride copolymer resins, vinyl chloride-acrylonitrile copolymer resins, butadiene-acrylonitrile copolymer resins, polyamide resins, polyvinyl butyral resins, polyester resins, cellulose derivative (nitrocellulose and the like) resins, styrene-butadiene copolymer resins, various synthetic rubber resins, phenol resins, urea resins, melamine resins, phenoxy resins, silicone resins, and urea formamide resins. Among these, epoxy resins (epoxy adhesive resins) and silicone resins are preferable, and epoxy resins are more preferable.

From the viewpoint of preventing the adhesive from spreading to make a bonded part 25 large and to make an effective area of gas separation membrane 2 small, the viscosity of the adhesive at 25° C. is preferably within a range of 5000 cP to 50000 cP, and more preferably within a range of 20000 cP to 50000 cP. The method for bonding separation membrane-and-feed-side flow path member complex 50 and permeate-side flow path member 4 is not limited to a method using an adhesive.

Laminate 7 is preferably wound around central tube 5 under tension. The adhesive is preferably applied in advance to both ends in a direction parallel to the axis of central tube 5 of permeate-side flow path member 4 where separation membrane-and-feed-side flow path member complex 50 is not laminated when laminate 7 is wound around central tube 5.

After the laminate 7 is wound around central tube 5 to obtain a wound body, an outer peripheral tape is wound around and fixed to the outer peripheral surface of the wound body, whereby the unwinding of the wound body can be suppressed. In order to prevent the winding collapse (telescope) phenomenon of the wound body from occurring during the use of gas separation membrane element 1, an anti-telescoping device can be attached to both ends of the wound body. A reinforcing material as an outer wrap (reinforcing layer) may be further wound around the outer periphery of the wound body around which the outer peripheral tape has been wound and to which the anti-telescoping device has been attached. Thereby, spiral-wound type gas separation membrane element 1 can be manufactured.

(3) Gas Separation Membrane Module

A gas separation membrane module includes at least one gas separation membrane element 1 in a housing (container) made of, for example, stainless steel. The gas separation membrane module can be manufactured by enclosing at least one gas separation membrane element 1 in the housing, and attaching an inlet/outlet port for feed gas and an outlet port for permeate gas to the housing.

The arrangement and number of gas separation membrane elements can be selected depending on the recovery ratio of a specific gas to be required. Here, the recovery ratio of the specific gas is a value calculated by the following formula:

Recovery ratio of specific gas=(flow rate of specific gas in permeate gas/flow rate of specific gas in feed gas)×100.

When two or more gas separation membrane elements 1 are disposed in the housing, two or more gas separation membrane elements 1 may be arranged in parallel or in series in the housing. Arrangement in parallel at least means that a feed gas is distributed and introduced into a feed-side end part 31 (FIG. 2) of a plurality of gas separation membrane elements 1. Arrangement in series at least means that a feed gas (retentate gas) that has not permeated through gas separation membrane 2 and discharged from a discharge-side end 33 (FIG. 2) in upstream gas separation membrane element 1 is introduced into the feed-side end part 31 of downstream gas separation membrane element 1.

For example, when two gas separation membrane elements 1 are arranged in parallel in the housing, the configuration may be such that gas separation membrane elements 1 are disposed apparently in series in housing 15; a feed gas is supplied from the inlet port provided in the housing 15 to two gas separation membrane elements 1 in parallel; and a retentate gas that has not permeated through gas separation membrane 2 of each gas separation membrane element 1 is discharged from the two outlet ports provided in housing 15. In this case, the inlet port of the feed gas and the outlet port of the retentate gas provided in housing 15 may each be provided for every gas separation membrane element 1, or may also be shared by two gas separation membrane elements 1. Alternatively, it is also possible that the feed gas inlet port is provided as a single, and the retentate gas outlet port is provided for every gas separation membrane element 1 to provide two outlet ports. Conversely, it is also possible that the feed gas inlet port is provided for every gas separation membrane element 1 to provide two inlet ports, and the retentate gas outlet port is provided as a single.

(4) Gas Separation Device

A gas separation device includes at least one gas separation membrane module. The arrangement and number of gas separation membrane modules provided in the gas separation device can be selected according to the required throughput, the recovery ratio of a specific gas, the size of the place to install the gas separation device, and the like.

The gas separation device includes a feed gas supply port, a permeate gas discharge port, and a retentate gas discharge port, which are respectively in communication with the gas supply port, permeate gas discharge port, and retentate gas discharge port of the gas separation membrane module. A feed gas supplied from the feed gas supply port of the gas separation device is introduced into the housing from the feed gas supply port of the gas separation membrane module, and is continuously supplied to feed-side flow path member 3 from feed-side end part 31 of gas separation membrane element 1 in the housing (an arrow a in FIG. 2). That is, the feed gas supply port is in communication with a feed-side flow path formed by the feed-side flow path member. The specific gas contained in the feed gas flowing through feed-side flow path member 3 permeates through gas separation membrane 2. The permeate gas having permeated through gas separation membrane 2 flows in permeate-side flow path member 4, and is supplied from holes 30 to central tube 5. The permeate gas is continuously collected from discharge port 32 of central tube 5 (an arrow b in FIG. 2), and then discharged from the permeate gas discharge port of the gas separation membrane module in communication with the inside of central tube 5. The permeate gas is discharged from the permeate gas discharge port of the gas separation device. When a sweep gas is supplied into permeate-side flow path member 4, the gas discharged from the permeate gas discharge port contains the sweep gas. Therefore, the composition and flow rate of the sweep gas may be selected so that the flow rate of the specific gas discharged from the permeate gas discharge port is a desired flow rate. The flow rate of the sweep gas can be configured to be adjusted by a sweep gas supply flow rate regulator (not shown). The retentate gas that has not permeated through gas separation membrane 2 is continuously discharged from discharge-side end 33 of the gas separation membrane module (an arrow c in FIG. 2), then discharged from the retentate gas discharge port of the gas separation membrane module in communication with discharge-side end 33, and discharged from the retentate gas discharge port of the gas separation device. Thus, the specific gas can be separated from the feed gas.

(5) Fuel Cell System

Figure 6:
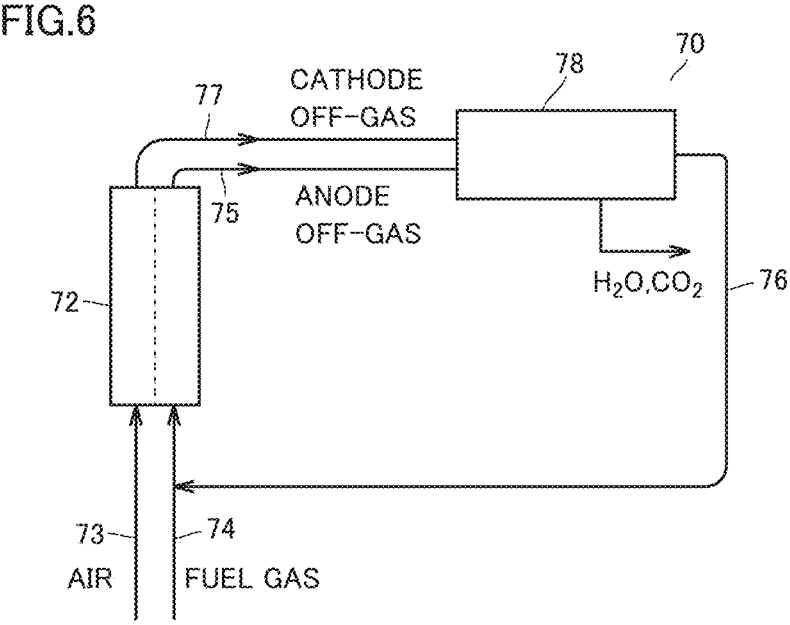
FIG. 6 is a schematic view showing a fuel cell system including a gas separation device according to the present invention as an example.

A gas separation device of the present invention is usefully used in a fuel cell system. FIG. 6 is a schematic view showing a fuel cell system including a gas separation device according to the present invention as an example. A fuel cell system 70 includes a fuel cell device 72, and a gas separation device 78 including gas separation membrane element 1' shown in FIG. 5.

Fuel cell device 72 is, for example, a solid oxide fuel cell. Although not shown, fuel cell device 72 includes an electrolyte layer, and an anode and a cathode respectively laminated on the front and back surfaces of the electrolyte layer. The anode is a fuel electrode, and the cathode is an air electrode.

Air is supplied to the cathode through an air supply path 73. In the cathode, oxygens and electrons react to form oxygen ions, which move through the electrolyte layer. A fuel gas is supplied to the anode through a fuel gas path 74. In the anode, hydrogen and carbon monoxide contained in the fuel gas react with the oxygen ions moving through the electrolyte layer to generate steam, carbon dioxide and electrons. The electrons generated in the anode move through an external circuit to the cathode. The movement of the electrons causes fuel cell device 72 to generate power.

An anode off-gas of fuel cell device 72 is discharged from an anode off-gas discharge port of fuel cell device 72, and supplied to a feed gas supply port of gas separation device 78 through an anode off-gas path 75. In gas separation device 78, steam and carbon dioxide are removed from the anode off-gas, and a gas containing unreacted hydrogen and carbon monoxide is discharged from a retentate gas discharge port of gas separation device 78. The gas is resupplied as a fuel gas to the anode of fuel cell device 72 through an exhaust gas path 76.

A cathode off-gas of fuel cell device 72 is discharged from a cathode off-gas discharge port of fuel cell device 72, and supplied to a sweep gas supply port of gas separation device 78 through a cathode off-gas path 77, to promote the flow of a permeate gas in a permeate-side flow path member as the sweep gas. The cathode off-gas is usually contained in air supplied to the cathode, and contains carbon dioxide and nitrogen that are not subjected to the reaction in the cathode, and oxygen unreacted in the cathode.

By using gas separation device 78 according to the present invention in fuel cell system 70, steam and carbon dioxide are removed from the used fuel gas at a high removal ratio, which allows the fuel gas to be reused, so that a fuel gas utilization rate and power generation efficiency can be improved.

EXAMPLES

Hereinafter, the present invention will be described in further detail with reference to Examples. The present invention, however, is not limited by these examples at all.

Example 1

(Production of Laminated Membrane M)

171 g of water, 4 g of crosslinking-type polyacrylic acid ("AQUPEC HV-501", manufactured by Sumitomo Seika Chemicals Co., Ltd.), 0.8 g of non-crosslinking-type polyacrylic acid ("AQUPAANA AP-40F", manufactured by Sumitomo Seika Chemicals Co., Ltd., 40% Na saponification), 38 g of an aqueous solution containing 50% by weight of cesium hydroxide, 3.2 g of an aqueous solution containing 10% by weight of sodium tellurite (manufactured by Wako Pure Chemical Industries, Ltd.), and 1.2 g of an aqueous solution containing 10% by weight of a surfactant ("Surflon S-242", manufactured by AGC Seimi Chemical Co., Ltd.) were added and mixed to obtain a coating solution.

The obtained coating solution was applied to a hydrophobic PTFE porous membrane ("POREFLON HP-010-50", manufactured by Sumitomo Electric Fine Polymer, Inc., thickness: 50 μm, pore size: 0.1 μm) as a porous layer, and a hydrophobic PTFE porous membrane (same as above) as a porous layer was superimposed thereon. The porous layers were dried at a temperature of about 120° C. for about 10 minutes, to produce a laminated membrane M including a hydrophilic resin composition layer between the two porous layers (hydrophobic PTFE porous membranes). The hydrophilic resin composition layer is a layer having a $CO_2$ separation function.

Next, on one porous layer of laminated membrane M, a polypropylene non-woven fabric ("PP6640-1A", manufactured by Shinwa Co., Ltd., Young's modulus: 62 MPa) as permeate-side surface layer 22 was laminated. On the other porous layer of laminated membrane M, a polypropylene non-woven fabric ("PP6640-1A", manufactured by Shinwa Co., Ltd., Young's modulus: 62 MPa) as a feed-side surface layer 23 was laminated to obtain a gas separation membrane in which permeate-side surface layer 22, laminated membrane M (porous layer/hydrophilic resin composition layer/porous layer), and feed-side surface layer 23 were laminated in this order.

(Measurement of $CO_2$ Permeation Flux)

Figure 7:
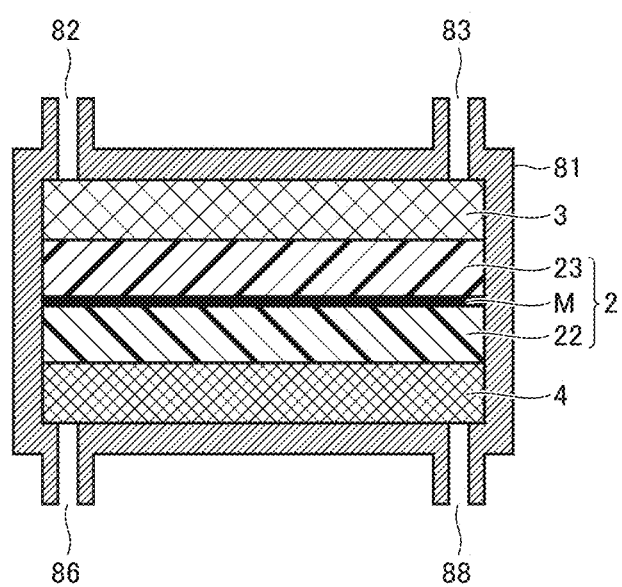
FIG. 7 is a schematic cross-sectional view showing a flat membrane housing used in a measuring device for measuring a $CO_2$ permeation flux, in which a gas separation membrane is set in the flat membrane housing.
Figure 8:
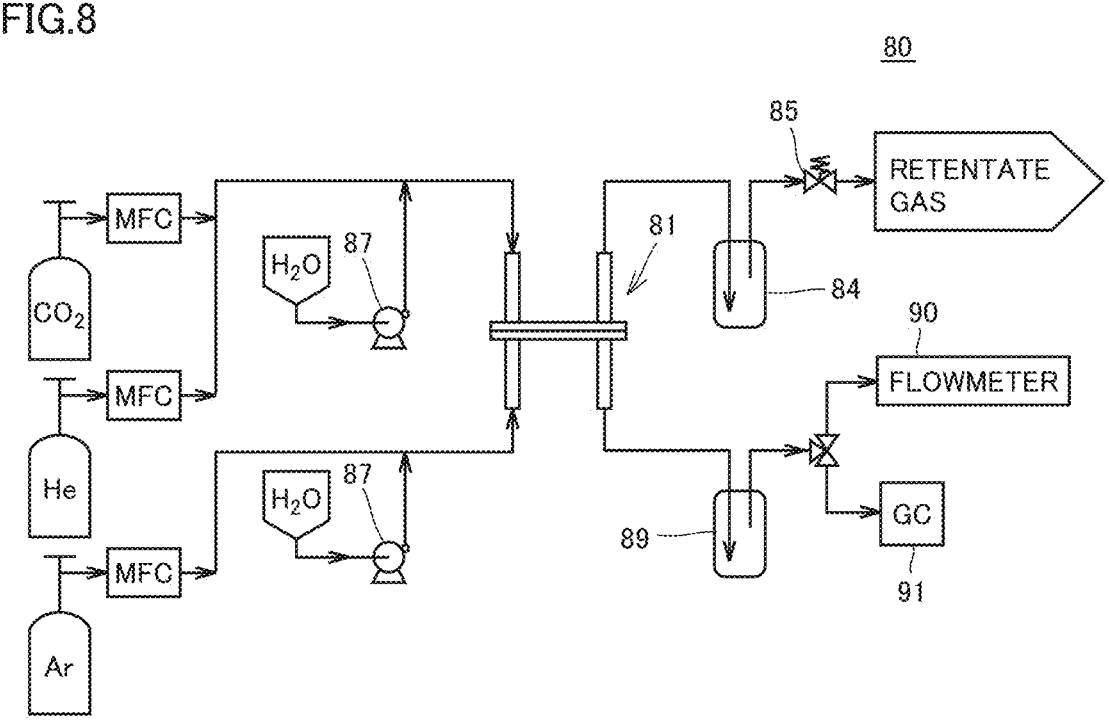
FIG. 8 is a schematic view showing a measuring device for measuring a $CO_2$ permeation flux.

A $CO_2$ permeation flux was measured in the following procedure by using laminated membrane M obtained above. FIG. 7 is a schematic cross-sectional view showing a flat membrane housing used in a measuring device for measuring a $CO_2$ permeation flux, in which a gas separation membrane is set in the flat membrane housing. FIG. 8 is a schematic view showing a measuring device for measuring a $CO_2$ permeation flux.

As shown in FIG. 7, prepared was a product obtained by setting permeate-side flow path member 4, permeate-side surface layer 22, laminated membrane M, feed-side surface layer 23, and feed-side flow path member 3 in this order in a stainless steel flat membrane housing 81 provided in a measuring device 80 for measuring a $CO_2$ permeation flux shown in FIG. 8. This was set as the model configuration of a gas separation membrane element. Permeate-side surface layer 22, laminated membrane M, and feed-side surface layer 23 constitute gas separation membrane 2. In Example 1, a laminate of two polypropylene nets (manufactured by DIO CHEMICALS, LTD., thickness: 508 μm, 25 mesh) as permeate-side flow path member 4 was used; a polypropylene non-woven fabric ("PP6640-1A", manufactured by Shinwa Co., Ltd., Young's modulus: 62 MPa) was used as permeate-side surface layer 22; a polypropylene non-woven fabric ("PP6640-1A", manufactured by Shinwa Co., Ltd., Young's modulus: 62 MPa) was used as feed-side surface layer 23; and a laminate of two polypropylene nets (manufactured by DIO CHEMICALS, LTD., thickness: 508 μm, 25 mesh) was used as feed-side flow path member 3. In flat membrane housing 81, gas separation membrane 2 separated a feed-side space formed by feed-side flow path member 3 from a permeate-side space formed by permeate-side flow path member 4. The effective area of gas separation membrane 2 was 64 cm$^2$.

In measuring device 80 shown in FIG. 8, whole flat membrane housing 81 in which the flow path members, the surface layers, and gas separation membrane 2 were set as described above was heated to 100° C. Thereafter, from a supply gas introduction part 82 (FIG. 7) of flat membrane housing 81, 120 NmL/min of $CO_2$ gas, 267 NmL/min of He gas, and 213 NmL/min of steam as feed gases were caused to flow in the feed-side space in flat membrane housing 81. At this time, moisture was removed from a retentate gas discharged from a feed gas discharge part 83 of flat membrane housing 81 in a cooling trap 84. The discharge amount of the retentate gas from which the moisture had been removed was adjusted by using a back pressure valve 85, to adjust the feed-side space in flat membrane housing 81 to 100 kPaG. From a sweep gas introduction part 86 (FIG. 7) of flat membrane housing 81, 357 NmL/min of Ar gas and 243 NmL/min of steam were caused to flow as a sweep gas into the permeate-side space in flat membrane housing 81. The steam was caused to flow by using a liquid feeding pump 87 in any case.

In a cooling trap 89, moisture was removed from the permeate gas that was discharged from a permeate gas discharge part 88 (FIG. 7) of flat membrane housing 81 in association with the sweep gas and that had permeated through gas separation membrane 2. The flow rate of the permeate gas from which the moisture had been removed was measured with a soap-film flowmeter 90. A value obtained by multiplying the measured flow rate by the composition of $CO_2$ measured by a gas chromatograph 91 was calculated. A value calculated in Example 1 was taken as 100 in order to evaluate the $CO_2$ permeation flux of each Example and each Comparative Example to be described later.

Example 2

A $CO_2$ permeation flux was evaluated in the same manner as in Example 1 except that a PPS non-woven fabric ("PS0100", manufactured by Hirose Paper Mfg Co., Ltd., Young's modulus: 293 MPa) was used as permeate-side surface layer 22. A value calculated in the evaluation of the $CO_2$ permeation flux was converted (as 100) based on the value obtained in Example 1. The results are shown in Table 1.

Example 3

A $CO_2$ permeation flux was evaluated in the same manner as in Example 1 except that two SUS nets (manufactured by DID CHEMICALS, LTD., thickness: 203.5 μm, 50 mesh) were used as permeate-side flow path member 4. A value calculated in the evaluation of the $CO_2$ permeation flux was converted (as 100) based on the value obtained in Example 1. The results are shown in Table 1.

Example 4

A $CO_2$ permeation flux was evaluated in the same manner as in Example 1 except that a gas separation membrane was obtained by using a PPS non-woven fabric ("PS0020S", manufactured by Hirose Paper Mfg Co., Ltd., Young's modulus: 1175 MPa) as feed-side surface layer 23. A value calculated in the evaluation of the $CO_2$ permeation flux was converted (as 100) based on the value obtained in Example 1. The results are shown in Table 1.

Comparative Example 1

A $CO_2$ permeation flux was evaluated in the same manner as in Example 1 except that a PPS non-woven fabric ("PS0100", manufactured by Hirose Paper Mfg Co., Ltd., Young's modulus: 293 MPa) was used as permeate-side surface layer 22; a PPS non-woven fabric ("PS0080S", manufactured by Hirose Paper Mfg Co., Ltd., Young's modulus: 458 MPa) was used as feed-side surface layer 23; and one SUS net (manufactured by DIO CHEMICALS, LTD., thickness: 102 μm, 100 mesh) was used as permeate-side flow path member 4. A value calculated in the evaluation of the $CO_2$ permeation flux was converted (as 100) based on the value obtained in Example 1. The results are shown in Table 1.

Comparative Example 2

A $CO_2$ permeation flux was evaluated in the same manner as in Example 1 except that PPS non-woven fabric ("PS0080S", manufactured by Hirose Paper Mfg Co., Ltd., Young's modulus: 458 MPa) was used as permeate-side surface layer 22; a PPS non-woven fabric ("PS0080S", manufactured by Hirose Paper Mfg Co., Ltd., Young's modulus: 458 MPa) was used as feed-side surface layer 23; and one SUS net (manufactured by DIO CHEMICALS, LTD., thickness: 102 μm, 100 mesh) was used as permeate-side flow path member 4. A value calculated in the evaluation of the $CO_2$ permeation flux was converted (as 100) based on the value obtained in Example 1. The results are shown in Table 1.

TABLE 1

| | Permeate-side surface layer Young's modulus [MPa] | Feed-side surface layer Young's modulus [MPa] | Permeate-side flow path member Thickness [μm] | Evaluation of $CO_2$ permeation flux |
|---|---|---|---|---|
| Example 1 | 62 | 62 | 1016 | 100 |
| Example 2 | 293 | 62 | 1016 | 98 |
| Example 3 | 62 | 62 | 407 | 95 |
| Example 4 | 62 | 1175 | 1016 | 95 |
| Comparative Example 1 | 293 | 458 | 102 | 82 |
| Comparative Example 2 | 458 | 458 | 102 | 77 |

REFERENCE SIGNS LIST

1: spiral-wound type gas separation membrane element (gas separation membrane element), 2: gas separation membrane, 3: feed-side flow path member, 4: permeate-side flow path member, 5: central tube, 7: laminate, 20: hydrophilic resin composition layer, 21: porous layer, 22: permeate-side surface layer, 23: feed-side surface layer, 25: bonded part, 30: hole, 31: feed-side end part, 32: discharge port, 33: discharge-side end part, 50: separation membrane-and-feed-side flow path member complex, 61: blocking member, 62: partition member, 70: fuel cell system, 72: fuel cell device, 73: air supply path, 74: fuel gas path, 75: anode off-gas path, 76: exhaust gas path, 77: cathode off-gas path, 78: gas separation device, 80: measuring device, 81: flat membrane housing, 82: feed gas introduction part, 83: feed gas discharge part, 84: cooling trap, 85: back pressure valve, 86: sweep gas introduction part, 87: liquid feeding pump, 88: permeate as discharge part, 89: cooling trap, 90: soap-membrane flowmeter, 91: gas chromatograph, M: laminated membrane

The invention claimed is:
1. A spiral-wound type gas separation membrane element comprising:
a central tube; and
a laminate wound around the central tube,
wherein
the laminate includes at least one structure where a feed-side flow path member, a gas separation membrane, and a permeate-side flow path member are superimposed in this order,
the permeate-side flow path member has a thickness of 400 μm to 1300 μm,
the gas separation membrane is a membrane where a hydrophilic resin composition layer, a porous layer, and a permeate-side surface layer are superimposed in this order, and
the permeate-side surface layer faces the permeate-side flow path member and has a Young's modulus of 20 MPa to 400 MPa.
2. The spiral-wound type gas separation membrane element according to claim 1,
wherein
the gas separation membrane further includes a feed-side surface layer opposite to the permeate-side surface layer, and
the feed-side surface layer has a Young's modulus of 20 MPa to 1200 MPa.
3. The spiral-wound type gas separation membrane element according to claim 1, wherein the central tube has a sweep gas supply port, and is in communication with a permeate-side flow path formed by the permeate-side flow path member.

4. The spiral-wound type gas separation membrane element according to claim 1, wherein the hydrophilic resin composition layer contains a hydrophilic resin and a carrier capable of reversibly reacting with a specific gas.

5. A gas separation membrane module comprising a housing including at least one spiral-wound type gas separation membrane element according to claim 1.

6. A gas separation device comprising at least one gas separation membrane module according to claim 5.

7. The gas separation device according to claim 6, wherein
the central tube of the spiral-wound type gas separation membrane element includes a sweep gas supply port, and
the gas separation device includes a sweep gas supply flow rate regulator regulating a flow rate of a sweep gas supplied from the sweep gas supply port to the central tube.

8. The gas separation device according to claim 7, wherein the sweep gas supply port is connected to at least one selected from the group consisting of a cathode off-gas discharge port of a fuel cell device, an air supplier, a steam supplier, a fuel gas supplier, and an exhaust gas discharge port.

9. The gas separation device according to claim 6, comprising:
a feed gas supply port in communication with a feed-side flow path formed by the feed-side flow path member; and
a permeate gas discharge port in communication with a permeate-side flow path formed by the permeate-side flow path member.

10. The gas separation device according to claim 9, wherein the feed gas supply port is connected to an anode off-gas discharge port of the fuel cell device.

11. The gas separation device according to claim 8, wherein the fuel cell device is a solid oxide fuel cell device.

* * * * *